United States Patent [19]

Challis

[11] Patent Number: 4,883,383

[45] Date of Patent: Nov. 28, 1989

[54] COMPONENT FASTENING SYSTEM

[76] Inventor: Brian Challis, No. 9 Northridge Way, Sandy, Utah 84092

[21] Appl. No.: 219,195

[22] Filed: Jul. 15, 1988

[51] Int. Cl.$^4$ ............................ F16D 1/00; F16B 5/00
[52] U.S. Cl. .................................. 403/407.1; 403/245
[58] Field of Search ..................... 403/407.1, 245, 382, 403/231

[56] References Cited

U.S. PATENT DOCUMENTS

| 747,854 | 12/1903 | Clark | 403/407.1 |
| 4,116,573 | 9/1978 | Fuchs | 403/407.1 |
| 4,160,610 | 7/1979 | Austen-Brown et al. | 403/407.1 |
| 4,728,215 | 3/1988 | Martinčič et al. | 403/245 |

FOREIGN PATENT DOCUMENTS

| 3309799 | 10/1983 | Fed. Rep. of Germany | 403/382 |
| 2313586 | 12/1976 | France | 403/231 |

Primary Examiner—David A. Scherbel
Assistant Examiner—Michele A. Van Patten
Attorney, Agent, or Firm—Thorpe, North & Western

[57] ABSTRACT

A system for joining staircase rails and similar articles together in an end-to-end relationship in which one of the rails is formed with a first generally cylindrical bore near one end of the rail to extend from the bottom of the rail upwardly toward the top thereof, and with a second bore extending along the axis of the rail from the first bore to an out the end of the rail. The system includes an elongate bolt, one end of which is affixable in the end of the other rail so that the other end of the bolt projects therefrom through the second bore into the first bore when the rails are placed end-to-end. The other end of the bolt includes a transversely extending hole for receiving a pin. The fastening system also includes an arcuate wedge element having a back section and two arcuate, generally parallel fingers extending from the back section and tapering from thicker ends at the back section to narrower free ends. The wedge element is dimensioned for insertion into the first bore when the pin is inserted into the hole of the bolt and positioned with its longitudinal axis generally parallel with the cylindrical axis of the first bore. Rotation of the wedge element about the axis of the first bore causes the two fingers to move, narrower ends first, between the pin and the sidewall of the first bore to force the pin away from the side wall and thereby urge the two rails into a tightened, secure, joined position.

14 Claims, 2 Drawing Sheets

COMPONENT FASTENING SYSTEM

BACKGROUND OF THE INVENTION

This invention relates to a system for fastening together two articles, such as staircase rails, in a mating relationship.

Typically, staircase rails are fastened together in an end-to-end relationship by forming a first opening or bore in the bottom of one of the rails near one end thereof, and forming a second bore which extends from the first bore to the end of the rail. The side of the first-mentioned bore nearest the rail end is morticed to accommodate a flat washer and nut. A hanger bolt with a standard washer is then used to join the two rails together by screwing the bolt into the end of the other complementary staircase rail so that machine screw threads of the bolt will extend through the second bore into the first bore. The washer and nut would then be placed on the bolt and tightened to pull the one staircase rail against the other staircase rail in a secure end-to-end disposition.

This arrangement, although tightly securing two staircase rails together, is difficult to manipulate--both to form the mortice and to tighten the nut against the morticed part of the first bore.

Other approaches are also used for joining two staircase rails together, but such approaches generally do not tightly secure the two rails together. For example, rails may be placed in an end-to-end relationship and then a wood screw screwed from the underneath side of one rail at an angle upwardly and toward the other rail to generally pull the two rails together. Alternatively, the two rails could simply be secured together by use of dowels extending parallel with the rails, and an adhesive such as epoxy. Neither of these techniques, however, sufficiently secures the rails together to hold up under the use and abuse staircase rails typically receive.

SUMMARY OF THE INVENTION

It is an object of the invention to provide a system for joining together in and end-to-end relationship two staircase rails, furniture components, and similar articles or components.

It is another object of the invention to provide such a system which is simple in construction and easy to employ in joining the staircase rails and similar articles together.

The above and other objects of the invention are realized in a specific illustrative embodiment of a device for joining staircase rails and the like together in a mating relationship, where one of the rails is formed with a first generally cylindrical bore near one end of the rail to extend from the bottom of the rail upwardly toward the top thereof, and with a second bore extending along the axis of the rail from the first bore to the end of the rail. The device includes an elongate bolt, one end of which is affixable in the end of the other rail. The other end of the bolt includes machine screw threads which, when the two rails are placed in an end-to-end relationship, extend through the second bore to a position in the first bore. The device also includes a generally cylindrically-shaped nut having a threaded bore extending transversely therethrough to enable screwing the nut onto the machine threads of the bolt when the other end of the bolt is positioned in the first bore. Alternately, the other end of the bolt could include a hole extending transversely therethrough near the end for receiving a pin to extend laterally from both sides of the bolt. Finally, the device includes an arcuate wedge having a back section and two arcuate, generally parallel fingers extending from the back section and tapering from thicker ends at the back section to narrower free ends. The wedge is dimensioned to enable insertion thereof into the first bore when the nut is screwed onto the machine threads of the bolt (or when the pin is inserted in the hole of the bolt) and when the nut (or pin) is positioned with its cylindrical axis generally parallel with the cylindrical axis of the first bore. After so inserted, the wedge may be rotated about the axis of the first bore so that the two fingers move, narrower ends first, between the nut (or pin) and adjacent side wall of the first bore, with the bolt positioned between the two fingers, to thereby urge the bolt further into the first bore to secure the two rails together.

In accordance with one aspect of the invention, the wedge may include a generally cylindrically shaped head formed to receive a tool which, when rotated, causes the wedge to rotate and pull the two rails together.

BRIEF DESCRIPTION OF THE DRAWINGS

The above and other objects, features and advantages of the invention will become apparent from a consideration of the following detailed description presented in connection with the drawings in which.

DETAILED DESCRIPTION

Figure 1:
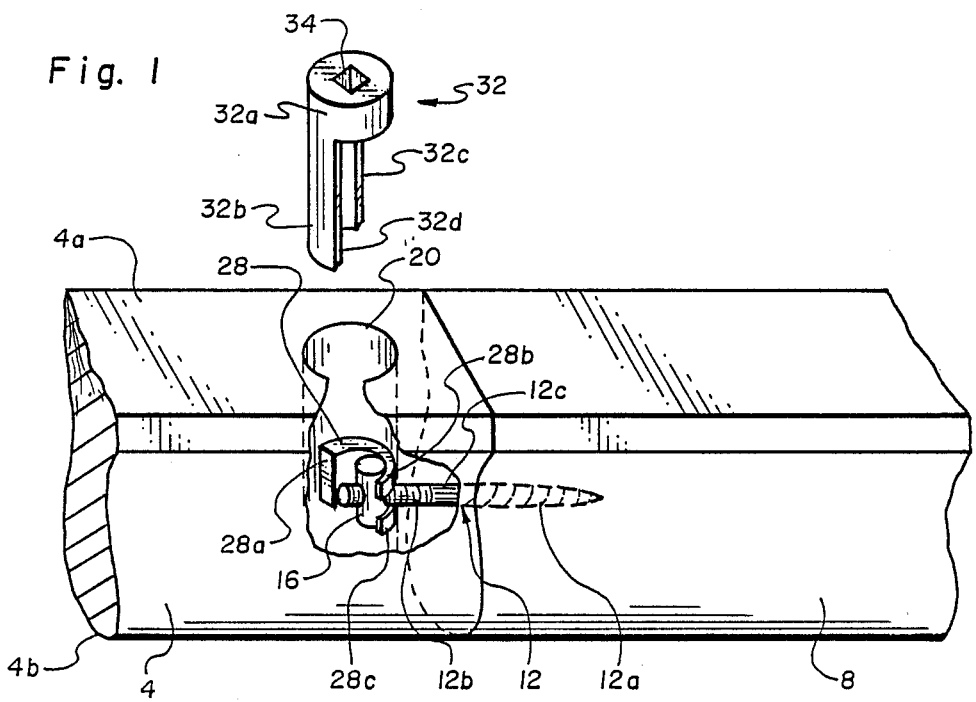
FIG. 1 shows a fragmented, partially cut-away, perspective view of a system for joining two staircase rails together, in a with the present invention.
Figure 2:
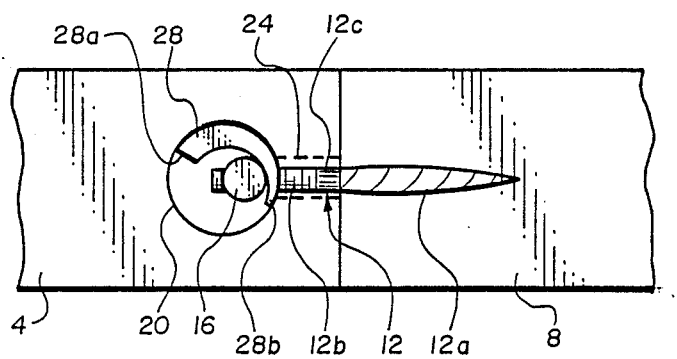
FIG. 2 shows a bottom, plan view of the system of FIG. 1.

Referring to FIGS. 1 and 2, there is shown one embodiment of the system of the present invention for fastening together two staircase rails 4 and 8 in an end-to-end relationship. However, it should be understood that the fastening system could be used to fasten together in a mating relationship any two articles having complementary, facing surfaces, e.g., a table leg to a table, multipiece countertops, cabinet panels, etc. The fastening system of FIGS. 1 and 2 includes a conventional hanger bolt 12, one end 12a of which includes wood screw threads and the other end 12b of which includes machine screw threads. The bolt 12 is screwed into the end of staircase rail 8 in a conventional fashion, such as by gripping and turning serrations 12c on the shank of the bolt between the wood screw threads 12a and the machine screw threads 12b. When the bolt 12 is screwed into the end of staircase rail 8, the bolt protrudes from the end of the rail 8 generally perpendicular to the end surface of the rail.

In order to accommodate the other apparatus of the fastening system, the staircase rail 4 is formed with a first opening or bore 20 which extends from the bottom side 4a of the rail (the rails 4 and 8 are shown upside-down in FIG. 1) toward the top side 4b. The bore 20 is generally cylindrical in shape and perpendicular to the bottom side 4a of the rail. A second bore 24, smaller than the first bore 20, extends from the bore 20 toward and out the end of the rail 4 to be generally perpendicular to the end surface of the rail 4, as best seen in FIG. 2.

After the bolt 12 is screwed into the end of staircase rail 8, the rails 4 and 8 are placed together in an end-to-end relationship as shown in FIGS. 1 and 2 so that the end of the bolt with the machine screw threads 12b extends through the bore 24 and into the bore 20. A cylindrically shaped nut 16 having a threaded bore extending transversely therethrough is then screwed onto the machine screw threaded end 12b of the bolt 12 to a point where it is spaced from the side wall of the bore 20 closest to the end of the rail 4 and so that the cylindrical axis of the nut 16 is generally parallel with the cylindrical axis of the bore 20, as shown in FIGS. 1 and 2.

The fastening system further includes an arcuate wedge element 28 having a back section 28a and a pair of generally parallel fingers 28b and 28c extending arcuately from the back section 28a in a semi-circular path. As best seen in FIG. 2, the wedge element 28 tapers from a thicker end at the back section 28a to a narrower end at the ends of fingers 28b and 28c. The fingers of the wedge element 28 are spaced apart a sufficient distance to receive therebetween the machine screw threaded end 12b of the bolt 12. The wedge element 28 might illustratively be made of steel, other hard metal or metallic compounds, or hard plastics.

The final step of joining the two staircase rails 4 and 8 together involves placing the wedge element 28 in the bore 20 on the side of the bore away from the location of the machine screw threaded end 12b and the cylindrical nut 16. The wedge element 28 is then rotated (in the clockwise direction looking at FIG. 2) so that the narrower end of the wedge element moves between the side wall of the bore and the nut 16 to engage the nut and urge it away from the side wall. As the thicker end of the wedge element 28 is rotated between the nut 16 and the side wall of the bore 20, the two rails 4 and 8 are pulled together in a continually tightening relationship.

A socket tool 32 is provided for rotating the wedge element 28 as described above. The socket tool includes a generally cylindrically shaped head 32a having a generally square-shaped opening 34 for receiving a square-shaped tool, screwdriver or wrench which, when rotated, will cause the socket tool 32 to rotate. The socket tool 32 also includes a generally semi-cylindrical skirt projecting downwardly from the head 32a and having a leading edge 32c and a trailing edge 32d. The tool 32 is inserted into the bore 20 so that the leading edge 32c of the skirt 32b contacts the thicker end 28a of the wedge element; then, when the tool 32 is rotated (clockwise looking down at FIG. 2) in the bore, it forces the wedge element 28 into a continually tightening position. When the desired tightness is established, the tool 32 is withdrawn from the bore 20 and the rails 4 and 8 are ready for use or installation. If desired, a plug or covering could be inserted into bore 20 to provide the staircase rail 4 with a finished look.

Figure 3:
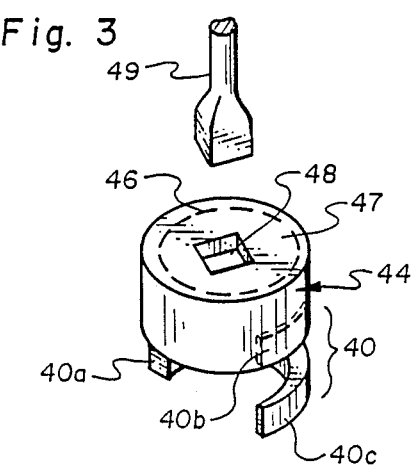
FIG. 3 shows a perspective view of an alternative embodiment of the wedge element of the present invention.

FIG. 3 shows an alternative embodiment of the wedge element of the fastening system of the present invention. This embodiment includes a wedge section 40 similar to the wedge element 28 of FIGS. 1 and 2, but with the top finger 40b being merged and made a part of a hollow cylindrical head 44. The thickness of the wall of the head 44 is the same as the thickness of that part of the finger above which the wall is located, as indicated by the dotted line 46 of FIG. 3. Formed in the top wall 47 of the head 44 is a generally square-shaped opening 48 for receiving a square-shaped tool, screwdriver or wrench 49 which, when rotated in a clockwise direction, would cause the wedge section 40 to be rotated to its locking position between a nut, such as nut 16 of FIGS. 1 and 2, and the side wall of a bore, such as bore 20 of FIGS. 1 and 2. After positioning the element of FIG. 3 in its locking position, the entire element would simply be left in place to maintain the two joined staircase rails together.

Figure 4:
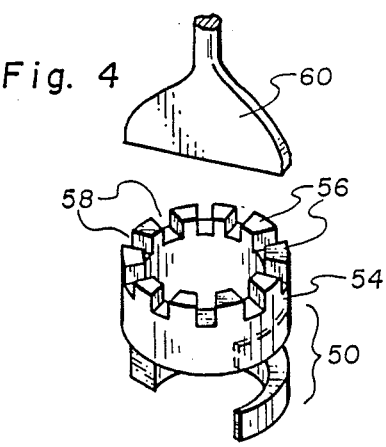
FIG. 4 shows a perspective view of still another embodiment of the wedge element of the present invention.

FIG. 4 shows still another alternative embodiment of the wedge element of the present invention. This embodiment likewise includes a wedge section 50 similar to the wedge section 40 of FIG. 3. A hollow cylindrical crown 54 is positioned on top of the wedge section 50 and joined thereto, with the crown being formed with a plurality of circularly spaced-apart upstanding projections 56, separated by cut-out or gap portions 58. The top cross-sections of the projections 56 (and of the gaps 58) are arcuate segments shaped to enable receiving and meshing with a circularly shaped tool having complementary projections and gaps so that when the tool and crown are intermeshed and the tool is rotated, the wedge section 50 will be rotated to a locking position between a nut and side wall of a bore as above described for the other embodiments. The element of FIG. 4 would, just as the element of FIG. 3, be left in place in the bore after being rotated to its locking position. It might be noted that the crown 54 could also receive a simple plate or screwdriver 60 large enough to span the width of the crown and small enough to be received within the gaps 58, for rotating the wedge section 50 as needed.

Figure 5:
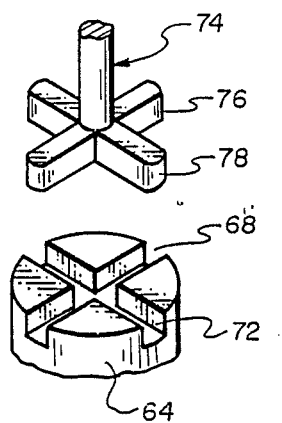
FIG. 5 is a perspective view of a further embodiment of the head section of the wedge element of the present invention.

FIG. 5 shows a perspective, fragmented view of a further embodiment of a head design for the wedge element of the present invention. In this embodiment, the top of the head 64 is formed with two intersecting grooves 68 and 72, sized to receive a tool 74 having two intersecting ribs 76 and 78 located at the lower end thereof, which fit into the grooves. Again, rotation of the tool 74, fitted into place in the grooves 68 and 72 when the wedge element is in position in the bore of a rail, will move the wedge element into locking position.

Figure 6:
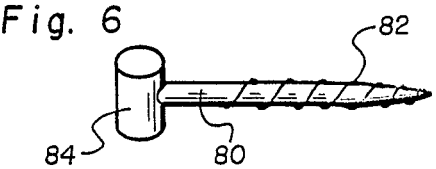
FIG. 6 is a perspective view of an alternative embodiment of a bolt useable with the present invention.

FIG. 6 shows an alternative embodiment to the hanger bolt 12 and cylindrical nut 16 shown in FIGS. 1 and 2. This embodiment comprises a shaft 80 having wood screw threads 82 formed at one end, and including a cylindrically-shaped head 84 formed at the other end. The cylindrical axis of the head 84 is generally perpendicular to the axis of the shaft 80. In use, the shaft 80 would be screwed into the end of a stair rail, such as rail 8 of FIG. 1, and that rail would be fitted end-to-end with another rail, such as rail 4 of FIG. 1. The bore 24 would be large enough to allow the head 84 to slide therethrough. In this position, the head 84 would be located in the bore 20 of rail 4 with the cylindrical axis of the head 84 being generally parallel with the cylindrical axis of the bore. Then, an appropriate wedge element would be placed in the bore and rotated about the head 84 to a locking position.

Figure 7:
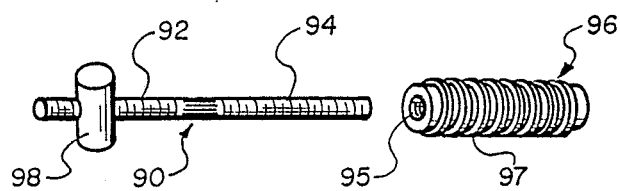
FIG. 7 is a perspective view of still another embodiment of a bolt useable with the present invention.

FIG. 7 shows anothe alternative embodiment to the hanger bolt 12 of FIGS. 1 and 2. This embodiment includes a bolt 90 having machine screw threads 92 and 94 at respective ends, with the end 94 being screwable into a channel 95 of an insert 96. The insert 96 includes threads 97 for allowing screwing of the insert 96 into a bore formed in the end of a rail; the bolt 90 may then be screwed into the insert so that the threaded end 92 of the bolt 90 would project out the end of the rail, similar to the hanger bolt 12 of FIG. 1. A cylindrical nut 98 is screwable on the threaded end 92 of the bolt 90.

Figure 8:
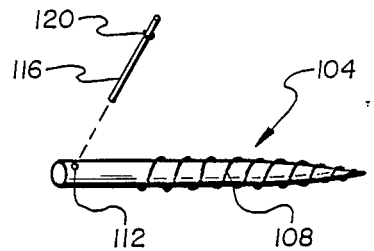
FIG. 8 is a perspective view of a further embodiment of a bolt useable with the present invention.

FIG. 8 shows a further embodiment of the hanger bolt useable with the present invention. This embodiment also includes a bolt 104 having wood screw threads 108 formed at one end, with the other end not including threads of any kind. The other end, however, does include a hole 112 which extends transversely through the bolt, for receiving a pin 116. The pin 116 is longer than the width of the bolt 104 so that when the pin is inserted into the hole 112, the ends of the pin project laterally from the sides of the bolt. When the pin 116 is inserted into the hole 112, a stop (enlarged portion) 120 on the pin prevents it from being pushed or falling all the way through the hole. Alternately, a wax or lubricant could be spread on the pin 116 to hold it in place in the hole 112, and also to allow a wedge element to more readily slide over the pin.

To join the rails (or other articles) together, the bolt 104 would be screwed into the end of one rail, that rail would then be fitted end-to-end with the other rail in which bores such as bores 20 and 24 of FIG. 1 had been formed, then a pin 116 would be inserted into the hole 112 to be generally parallel with the cylindrical axis of the bore 20. With the end of the bolt 104 and the pin 116 positioned in the bore 20 of the other rail, a wedge element can be placed in the bore and rotated about the pin to a locking position.

With the embodiment of FIG. 8, a wedge element in which the fingers are formed to be continuous rings (similar to the top finger 40b of FIG. 3), rather than with terminations (as with finger 40c of FIG. 3) could be used. In this case, the bolt 104 would be screwed into the end of one rail, the wedge element would be inserted into a bore 20 of the other rail, and then the two rails would be placed end-to-end so that the free end of the bolt 104 extends through the bore 24 and between the fingers of the wedge element. The pin 116 would then be inserted into the center of the wedge element and into the hole 112, after which the wedge element could be rotated about the pin to lock the rails together.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. Apparatus for fastening together in a mating relationship two articles having complementary, facing surfaces, wherein one of the articles has a cylindrical opening whose axis is generally parallel with said one article's facing surface, and a bore extending from the cylindrical opening to the facing surface ay an orientation generally perpendicular thereto, said apparatus comprising an elongate shaft, one end of which is fixable in the facing surface of the other article so that the other end of the shaft projects generally perpendicularly therefrom to extend through the bore and into the cylindrical opening of said one article when the articles are placed with their facing surfaces together in a mating relationship, the other end of said shaft including a generally cylindrically-shaped element whose cylindrical axis is substantially perpendicular to the longitudinal axis of the shaft and is positioned to be generally parallel with the cylindrical axis of the opening, an arcuate wedge means tapered from a thick back end to a narrower front end, the outer surface of the wedge means being shaped to generally conform to the side wall of the cylindrical opening to enable inserting the wedge means into the opening, and rotating the wedge means about the axis of the opening so that the wedge means moves, front end first, between the cylindrically-shaped element and adjacent side wall of the opening to increasingly urge the element away from the wall to thereby secure the two articles together, and socket means comprising
a generally cylindrically shaped head having a tool receiving element to which a tool may be attached for causing rotation of the head, and
a generally semicylindrical skirt projecting downwardly from the head and having a leading edge and a trailing edge, said skirt being dimensioned to enable insertion thereof into the opening of said one article in registry with the wedge means so that as the head is rotated, the leading edge of the skirt engages the back end of the wedge means to cause the wedge means to rotate.

2. Apparatus as in claim 1 wherein said wedge means comprises a back section and a pair of arcuate, spaced-apart, generally parallel fingers extending about a wedge means axis from the back section at a point of greatest thickness to narrower front ends, with the spacing between the fingers being sufficient to receive said other end of the shaft when the wedge means is rotated in said opening to secure the two articles together.

3. Apparatus as in claim 1 wherein said tool receiving element comprises a noncircular opening shaped to receive a similarly shaped projection of a tool so that when the projection is inserted into the opening and rotated, the socket means is caused to rotate.

4. Apparatus as in claim 3 wherein said noncircular opening is square shaped to receive the square-shaped projection of a conventional socket wrench.

5. Apparatus for fastening together in a mating relationship two articles having complementary, facing surfaces, wherein one of the articles has a cylindrical opening whose axis is generally parallel with said one articles's facing surface, and a bore extending from the cyclindrical opening to the facing surface at an orientation generally perpendicular thereto, said apparatus comprising an elongate shaft, one end of which is fixable in the facing surface of the other article so that the other end of the shaft projects generally perpendicularly therefrom to extend through the bore and into the cylindrical opening of said one article when the articles are placed with their facing surfaces together in a mating relationship, the other end of said shaft including a generally cylindrically-shaped element whose cylindrical axis is substantially perpendicular to the longitudinal axis of the shaft and is positioned to be generally parallel with the cylindrical axis of the opening, and an arcuate wedge means tapered from a thick back end to a narrower front end, the outer surface of the wedge means being shaped to generally conform to the side walls of the cylindrical opening to enable inserting the wedge means into the opening, the rotating the wedge means about the axis of the opening so that the wedge means move, front end first, between the cylindrically-shaped element and adjacent side wall of the opening to increasingly urge the element away from the wall to thereby secure the two articles together, wherein said wedge means comprises a hollow generally cylindrical head section having a wall which tapers circumferentially from a thicker back locus to a narrower front locus adjacent to the back locus, and an arcuate finger spaced below the head section and extending in a demicircle about the cylindrical axis of the head section from a point below the back locus, where the finger has substantially the same thickness as the back locus of the head section, to a narrower front end, where the thickness of the finger is substantially the same as the thickness of the wall of the head section just above said front end, with the spacing between the head section and the finger being sufficient to receive said other end of the shaft when the wedge means is rotated in said opening to secure the two articles together, said head section including tool receiving means into which a tool may be inserted for causing rotation of the wedge means.

6. Apparatus as in claim 5 wherein said tool receiving means comprises a noncircular opening shaped to receive a similarly shaped projection of a tool so that when the projection is inserted into the opening and rotated, the wedge means is caused to rotate.

7. Apparatus as in claim 6 wherein said noncircular opening is square shaped to receive the square-shaped projection of a conventional socket wrench.

8. Apparatus as in claim 5 wherein said tool receiving means comprises a pattern of grooves into which may be placed a tool having a like pattern of ridges so that when the tool is rotated, the wedge means is caused to rotate.

9. Apparatus as in claim 5 wherein said tool receiving means comprises a generally circular crown formed on the top of the head section to at least partially circumscribe the wedge means axis, said crown including a plurality of spaced-apart upstanding projection for receiving and meshing with a tool used to rotate the wedge means.

10. Apparatus as in claim 9 wherein said projections are spaced apart equally and have trapezoidal shaped top cross-sections.

11. Apparatus for fastening together in a mating relationship two articles having complementary, facing surfaces, wherein one of the articles has a cylindrical opening whose axis is generally parallel with said one article's facing surface, and a bore extending from the cylindrical opening to the facing surface at an orientation generally perpendicular thereto, said apparatus comprising an elongate shaft, one end of which is fixable in the facing surface of the other article so that the other end of the shaft projects generally perpendicularly therefrom to extend through the bore and into the cylindrical opening of said one article when the articles are placed with their facing surfaces together in a mating relationship, the other end of said shaft including a generally cylindrically-shaped element whose cylindrical axis is substantially perpendicular to the longitudinal axis of the shaft and is positioned to be generally parallel with the cylindrical axis of the opening, and an arcuate wedge means tapered from a thick back end to a narrower front end, the outer surface of the wedge means being shaped to generally conform to the side walls of the cylindrical opening to enable inserting the wedge means into the opening, the rotating the wedge means about the axis of the opening so that the wedge means moves, front end first, between the cylindrically-shaped element and adjacent side wall of the opening to increasingly urge the element away from the wall to thereby secure the two articles together, wherein said elongate shaft comprises a hanger bolt, one end of which includes wood screw threads to enable screwing said one end into the facing surface of the other article, and the other end of which includes machine screw threads, and wherein said cylindrically-shaped element comprises a cylindrically-shaped nut having a threaded bore extending transversely therethrough to enable screwing the nut onto the machine screw threads of the hanger bolt.

12. Apparatus as in claim 1 or 5 wherein said elongate shaft comprises a wood screw having a threaded end and a head end transversely through which a hole is formed, and wherein said cylindrically-shaped element comprises a pin dimensioned for insertion into the hole in the bolt so that the ends of pin project laterally from opposite sides of the head end of the bolt.

13. Apparatus as in claim 1 or 5 wherein said elongate shaft comprises a wood screw having a threaded end and a head end transversely through which a hole is formed, and wherein said cylindrically-shaped element comprises a pin dimensioned for insertion into the hole in the bolt so that the ends of pin project laterally from opposite sides of the head end of the bolt.

14. Apparatus as in claim 1 or 5 wherein said elongate shaft includes a bolt, one end of which includes machine screw threads and the other end of which includes the cylindrically-shaped element, said apparatus further including a cylindrically-shaped insert having a threaded central bore into which the bolt may be screwed, and having threads on the exterior thereof to enable screwing the insert into a bore formed in said other article to be generally perpendicular to the facing surface of said other article.

* * * * *